United States Patent
Shah et al.

(10) Patent No.: US 6,957,069 B2
(45) Date of Patent: Oct. 18, 2005

(54) WIRELESS PERSONAL COMMUNICATOR AND COMMUNICATION METHOD

(75) Inventors: Yogendra Shah, Devon, PA (US); Narayan Parappil Menon, Old Bethpage, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 261 days.

(21) Appl. No.: 10/629,148

(22) Filed: Jul. 29, 2003

(65) Prior Publication Data

US 2004/0023652 A1    Feb. 5, 2004

Related U.S. Application Data

(60) Provisional application No. 60/399,801, filed on Jul. 31, 2002.

(51) Int. Cl.$^7$ .............................................. H04Q 7/20
(52) U.S. Cl. ...................... 455/436; 455/437; 455/438; 455/439; 455/440; 370/331; 370/332; 370/333
(58) Field of Search ............................... 455/436, 437, 455/438, 439, 440, 442, 443, 444, 552.1; 370/331, 332, 333

(56) References Cited

U.S. PATENT DOCUMENTS

| | | | |
|---|---|---|---|
| 5,657,375 A | * | 8/1997 | Connolly et al. ........... 455/436 |
| 5,697,055 A | * | 12/1997 | Gilhousen et al. .......... 455/436 |
| 5,737,703 A | * | 4/1998 | Byrne ......................... 455/442 |
| 5,974,036 A | * | 10/1999 | Acharya et al. ............ 370/331 |
| 5,987,011 A | * | 11/1999 | Toh ............................ 370/331 |
| 6,243,585 B1 | * | 6/2001 | Pelech et al. ............... 455/449 |
| 6,421,538 B1 | | 7/2002 | Byrne |
| 6,614,784 B1 | * | 9/2003 | Glitho et al. ............... 370/352 |
| 6,804,532 B1 | * | 10/2004 | Moon et al. ............. 455/552.1 |
| 6,888,811 B2 | * | 5/2005 | Eaton et al. ............. 455/456.2 |
| 2003/0013482 A1 | * | 1/2003 | Brankovic ................... 455/553 |
| 2003/0157934 A1 | * | 8/2003 | Liang ......................... 455/436 |
| 2003/0214921 A1 | * | 11/2003 | Alapuranen et al. ........ 370/328 |

* cited by examiner

Primary Examiner—Emmanuel L. Moise
Assistant Examiner—Huy D. Nguyen
(74) Attorney, Agent, or Firm—Volpe and Koenig, P.C.

(57) ABSTRACT

A personal communicator in the form of a wireless transmit/receive unit (WTRU) can communicate in multiple modes to provide a user with seamless roaming, handover, and session continuity between multiple network or peer to peer communications. The WTRU has selectively operable transceiver components that are configured for wireless mobile network communications with mobile network base stations, wireless local network communications with local network base stations, and wireless peer to peer communications with other WTRUs. Various methods are provided utilizing the WTRU's multiple network communicating capabilities.

10 Claims, 4 Drawing Sheets

WIRELESS PERSONAL COMMUNICATOR AND COMMUNICATION METHOD

CROSS REFERENCE TO RELATED APPLICATION(S)

This application claims priority from U.S. provisional 60/399,801 filed on Jul. 31, 2002 which is incorporated by reference as if fully set forth herein.

FIELD OF INVENTION

This application relates to wireless communication with wireless transmit/receive units (WTRUs) in multiple communication system environments.

BACKGROUND OF THE INVENTION

Wireless communication systems are well known in the art. Generally, such systems comprise communication stations which transmit and receive wireless communication signals between each other. For network systems such as mobile cellular systems, there are typically two types of communication stations, namely, base stations which provide access to the network infrastructure and wireless transmit/receive units (WTRUs) which conduct wireless communications with the base stations. Networking between WTRUs without network base stations, known as ad hoc networking, is also known in the art.

There is a growing dependence upon wireless communications in the home, office, and when traveling. It is not uncommon for a user to have several different WTRUs such as different home, office, and mobile wireless telephones. There is a need to replace the use of multiple WTRUs with a single WTRU which can be used in the home, office, or when traveling.

In many commercial networks, a network of base stations is provided wherein each base station is capable of conducting multiple concurrent wireless communications with appropriately configured WTRUs. Some WTRUs are configured to conduct wireless communications directly between each other, i.e., without being relayed through a network via a base station. This is commonly called peer to peer wireless communications.

One type of wireless system, called a wireless local area network (WLAN), can be configured to conduct wireless communications with WTRUs equipped with WLAN modems that are also able to conduct peer to peer communications with similarly equipped WTRUs. Currently, WLAN modems are being integrated into many traditional communicating and computing devices by manufactures. For example, cellular phones, personal digital assistants, and laptop computers are being built with one or more WLAN modems. Accordingly, there is an increasing need to facilitate communications among such WTRUs with WLAN modems. For instance, it would be desirable if a first user of a PDA equipped with a WLAN modem could share data, such as a phone book, with a second user having a cellular phone equipped with a WLAN modem locally without going through a telecommunications network.

A popular wireless local area network environment with one or more WLAN access points, i.e., base stations, is built according to the IEEE 802.11b standard. The wireless service areas for such WLANs may be restricted to specified well defined geographic areas known as "hot spots". Such wireless communication systems are advantageously deployed in areas such as airports, coffee shops, and hotels.

Access to these networks usually requires user authentication procedures. Protocols for such systems are not yet fully standardized in the WLAN technology area, since the IEEE 802 family of standards is evolving.

There are two prevalent ways to implement wireless communications in WLAN and other networks: 1) an infrastructure mode; and 2) an ad-hoc mode. FIG. 1A illustrates an infrastructure mode, where WTRUs conduct wireless communications via a base station 54 that serves as an access point to network infrastructure 16. The base station 54 is shown as conducting communications with WTRU 18, WTRU 20, WTRU 22, WTRU 24 and WTRU 26. There are no direct intercommunications between the WTRUs illustrated in FIG. 1A. The communications are coordinated and synchronized through the base station 54. Such a configuration is also called a basic service set (BSS).

Infrastructure mode can provide an Extended Service Set (ESS) that is a set of two or more BSSs forming a single sub network. Many corporate WLANs require access to a wired local area network (LAN) for services such as file servers, printers, and Internet links, and they operate in an infrastructure mode.

In contrast to infrastructure mode, ad hoc mode does not normally use the network infrastructure. Ad hoc mode operates with peer to peer communications and is also called "independent BSS." In ad-hoc mode, two or more WTRUs establish a communication among themselves without the need of a coordinating network element, i.e., a base station. Ad hoc mode operation is illustrated in FIG. 1B where WTRUs 22, 24, 26 are communicating without a connection to a network base station.

In ad-hoc mode, access points to network infrastructure are not required. However, a base station can be configured with the ad hoc protocols to act as the other WTRUs in peer to peer communications. In such a case, a base station may act as a bridge or router to another network or to the Internet. Where a base station does join an ad hoc network, it is treated as another WTRU and does not normally control the flow of communication. For example, FIG. 1B illustrates base station 54 in communication with WTRU 18 and WTRU 20 in an ad hoc network. In this scenario, the base station 54 does not control the flow of data.

Communications are normally limited to the other stations in an ad hoc network, but one WTRU may communicate indirectly with another WTRU via a third WTRU. For example, as shown in FIG. 1B, where both WTRU 22 and WTRU 24 are communicating in ad hoc mode with WTRU 26, communications may occur between WTRU 22 and WTRU 24. Additionally, when a WTRU is in ad hoc mode, it typically ignores infrastructure mode base station transmissions. It is also necessary for one WTRU to initiate ad hoc mode and other WTRUs to join in. The other stations will assimilate the operating parameter information as they join the ad hoc network.

The station that starts an ad hoc network selects the ad hoc network's operating parameters, such as the service set identifier (SSID), channel, and beacon timing, and then transmits this information in, for example, beacon frames. As stations join the ad hoc network, they assimilate the operating parameters. In infrastructure mode, parameters such as the SSID are normally specified by a network controller connected to network base stations.

The SSID in an IEEE 802-based system can be a 32-character unique identifier attached to a header of packets sent over a WLAN. The SSID then acts as a password when a WTRU attempts to connect to a BSS or an independent BSS. The SSID differentiates one WLAN from another, so all base stations and all devices attempting to connect to a specific WLAN normally use the same SSID. A device will not normally be permitted to join a BSS unless it can provide the unique SSID.

In an IEEE 802-based system, once more than one station is part of an ad hoc network, all of the stations share the burden of sending beacon frames by a random distribution of that task to each station. Algorithms such as the spokesman election algorithm have been designed to "elect" one device as a master station, i.e., a pseudo base station, of the ad hoc network with all other stations being slaves.

In lieu of using a different WTRU in each different environment, it would be advantageous to have a WTRU personal communicator capable of switching from one type of network to another without a loss of connectivity. For example, a mobile WTRU communicating with or seeking to communicate with a target WTRU may travel into areas of poor signal quality where the communications with a particular network that serves the target WTRU becomes sporadic or nonexistent. In such cases, it would also be desirable if the WTRU can switch to a different network or a peer to peer communication to relay communication through another WTRU which is in direct contact with a target WTRU or a network through which a target WTRU can be reached.

SUMMARY

The present invention provides a personal communicator in the form of a wireless transmit/receive unit (WTRU) that can communicate in multiple modes to provide a user with seamless roaming, handover, and session continuity between multiple network or peer to peer communications.

A wireless transmit/receive unit (WTRU) is provided for communication in a wireless mobile network, at least one local wireless network, and for peer to peer wireless communications with other such WTRUs. The WTRU has selectively operable transceiver components that are configured for wireless mobile network communications with mobile network base stations, wireless local network communications with local network base stations, and wireless peer to peer communications with other WTRUs. The WTRU has a transceiver controller configured to selectively control wireless communications with mobile network base stations based on communication signals received from local network base stations or other WTRUs.

The transceiver controller operates such that a wireless mobile network communication is switched to a local network base station or other WTRU when wireless communication signals received from such local network base station or other WTRU indicates a first predetermined quality of service level available therefrom. The transceiver controller also operates such that a wireless mobile network communication is sought to be established when a wireless communication with a local network base station or other WTRU indicates that at least a second predetermined quality of service level is no longer available therefrom and no communication signals are received from a local network base station or other WTRU that indicate availability of the first predetermined quality of service level.

Preferably, the transceiver controller is configured to selectively control wireless communications with local network base stations based on communication signals received from other WTRUs such that a wireless local network communication is switched to another WTRU when communication signals received from such other WTRU indicates a third predetermined quality of service level is available therefrom. Preferably, the transceiver controller also operates such that a wireless local network communication is sought to be established when a communication with another WTRU indicates that at least a fourth predetermined quality of service level is no longer available therefrom and no communication signals are received from other WTRUs that indicate availability of the third predetermined quality of service level.

Preferably, the first predetermined quality of service level used by the transceiver controller is no greater than the third predetermined quality of service level used by the transceiver controller and the second predetermined quality of service level used by the transceiver controller is no greater than the fourth predetermined quality of service level used by the transceiver controller.

The transceiver components may include a wireless local area network (WLAN) modem for the peer to peer communications with other WTRUs. Where the WTRU is a mobile unit, the transceiver controller can be configured to use a pre-determined quality of service level based on a quality of radio signal criteria in combination with a relative cost criteria, a power consumption criteria and/or an estimate of the geographic location of the mobile unit. Where quality of service thresholds are based in part on an estimate of the geographic location of the mobile unit, the WTRU is preferably equipped with a Global Positioning System (GPS) for generating the estimate of the geographic location of the mobile unit.

Various methods of communication using a WTRU within multiple networks including a wireless mobile network, at least one local wireless network, and ad hoc peer to peer wireless networks with other WTRUs are set forth. As noted above, the WTRUs have selectively operable transceiver components that are configured for wireless mobile network communications with mobile network base stations, wireless local network communications with local network base stations, and ad hoc peer to peer wireless network communications with other WTRUs.

Wireless communications of the WTRUs with mobile network base stations are selectively controlled based on communication signals received from local network base stations or other WTRUs. A wireless mobile network communication is switched to a local network base station or other WTRU when wireless communication signals received from such local network base station or other WTRU indicates a first predetermined quality of service level available therefrom. A wireless mobile network communication is sought to be established when a wireless communication with a local network base station or other WTRU indicates that at least a second predetermined quality of service level is no longer available therefrom and no communication signals are received from a local network base station or other WTRU that indicate availability of the first predetermined quality of service level.

Preferably, the wireless communications with local network base stations is selectively control based on communication signals received from other WTRUs. Preferably, a wireless local network communication is switched to another WTRU when communication signals received from such other WTRU indicates a third predetermined quality of service level is available therefrom. Preferably, a wireless local network communication is sought to be established when a communication with another WTRU indicates that at least a fourth predetermined quality of service level is no longer available therefrom and no communication signals are received from other WTRUs that indicate availability of the third predetermined quality of service level.

The invention includes methods for conducting an informational communication between a first WTRU and a target WTRU with which a direct wireless communication cannot then be established. In one method, a wireless communication is established between the first WTRU and a second WTRU when wireless communication signals received from such second WTRU indicates a first predetermined quality of service level available therefrom. The informational communication from the first WTRU is relayed via the second WTRU to a mobile network base station, a local network base station, or another WTRU when wireless communication signals received from such mobile network base station, local network base station, or other WTRU indicates a first predetermined quality of service level available therefrom to the second WTRU. The method may include establishing a wireless communication between the target WTRU and the second WTRU when wireless communication signals received from such the second WTRU indicates a first predetermined quality of service level available therefrom to the target WTRU.

Where the relaying of the informational communication via the second WTRU is to a mobile network base station with which the second WTRU has established a wireless mobile network communication, the wireless communication of the second WTRU with the mobile network base station is preferably selectively controlling based on communication signals received from local network base stations or other WTRUs as referenced above. Where the relaying of the informational communication via the second WTRU is to a local network base station with which the second WTRU has established a wireless local network communication, the wireless communication of the second WTRU with the local network base station is preferably selectively controlling based on communication signals received from other WTRUs as referenced above. The method can then include relocating the target WTRU relative to the second WTRU so that wireless communication signals received between the second WTRU and the target WTRU indicate a first predetermined quality of service level available therebetween whereby the second WTRU's wireless network communication is switched to the target WTRU so that the informational communication is continued as an ad hoc wireless network communication between the first WTRU and the target WTRU via the second WTRU.

The method of conducting an informational communication between a first WTRU and a target WTRU can includes establishing a wireless communication between the target WTRU and the mobile network base station, local network base station, or other WTRU to which the informational communication is relayed from a second WTRU when wireless communication signals received from such mobile network base station, local network base station, or other WTRU indicates a first predetermined quality of service level available therefrom to the target WTRU.

Where the method includes relaying the informational communication via the second WTRU to a mobile network base station with which the target WTRU has established a wireless mobile network communication, the wireless communication of the target WTRU with the mobile network base station is preferably selectively controlling based on communication signals received from local network base stations or other WTRUs as referenced above. Where the method includes relaying the informational communication via the second WTRU to a local network base station with which the target WTRU has established a wireless local network communication, the wireless communication of the target WTRU with the local network base station is preferably selectively controlling based on communication signals received from other WTRUs as referenced above. The method can then include relocating the first WTRU relative to the target WTRU so that wireless communication signals received between the first WTRU and the target WTRU indicate a first predetermined quality of service level available therebetween whereby the target WTRU's wireless network communication is switched to the first WTRU so that the informational communication is continued as a direct wireless communication between the first WTRU and the target WTRU.

Other objects and advantages of the present invention will be apparent to persons skilled in the art from the following description and accompanying drawings.

DETAILED DESCRIPTION OF THE PREFERRED EMBODIMENTS

Figure 1A:
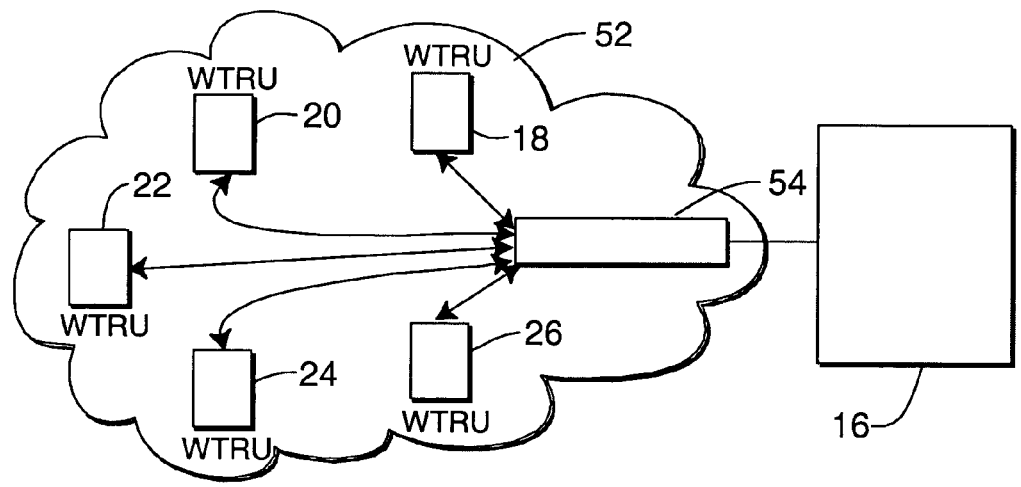
FIG. 1A is a diagram of a communications system operating in an infrastructure network mode of operation.
Figure 1B:
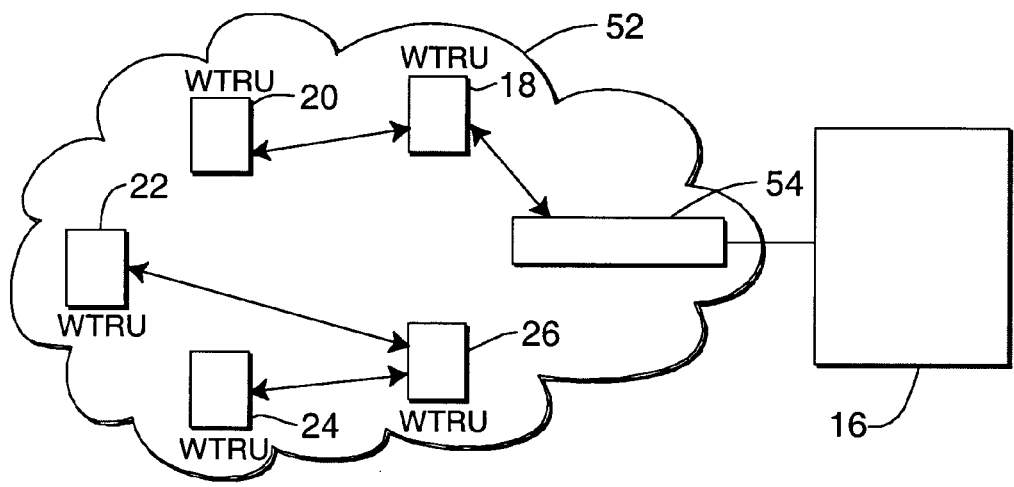
FIG. 1B is a diagram of a communications system operating in an ad-hoc network mode of operation.

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention provides a WTRU for use with multiple types of wireless radio access networking either via peer to peer WTRU communications, networked base station communications, or a combination of both types. The invention is particularly useful when used in conjunction with mobile units, i.e., mobile WTRUs that are capable of travel through the respective areas of geographic coverage provided by multiple networks.

Figure 1C:
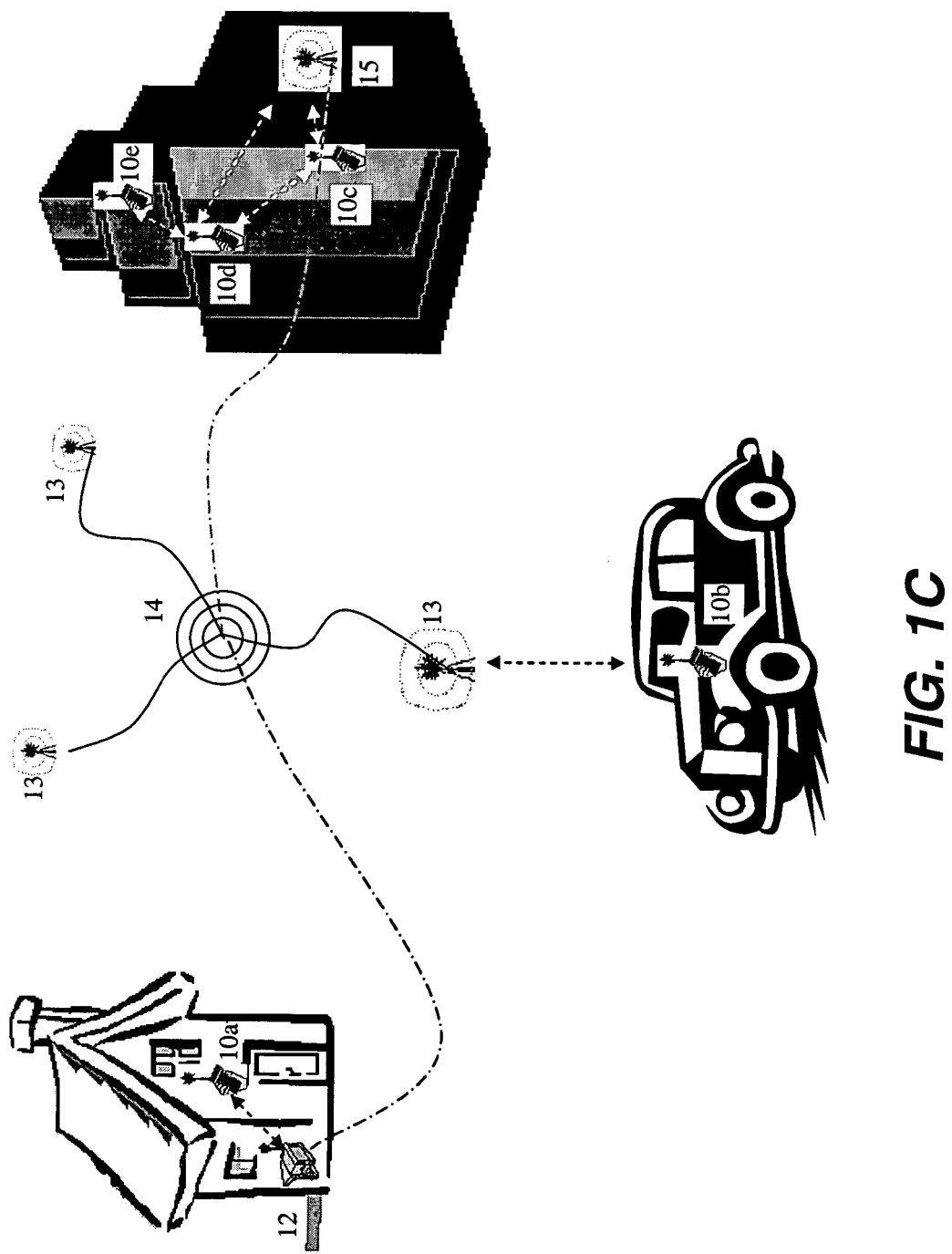
FIG. 1C is a schematic diagram of the operation of personal communicators in accordance with the teachings of the present invention.

Referring to FIG. 1C, personal communicators 10a–e are configured for communications between themselves and other connectable devices via any one of a number of wireless systems, such as a home network having a base station 12, a mobile network 14 with base stations 13, and a private office network having a base station 15. Home and private office networks can use, for example, relatively low cost wireless technologies such as Bluetooth or W-LAN that can also facilitate a physical layer basis for ad hoc network communications between WTRUs 10a–e as illustrated in the office network shown in FIG. 1C. The mobile cellular network 14 can use, for example, technologies such as GSM/GPRS, CDMA2000, and UMTS which are widely used for cellular telephone networks. The respective home, mobile, and private office networks themselves are interconnected, as indicated by broken lines in FIG. 1C, such as via land lines, PBX, the Internet, or other types of well known network interfaces.

When in the coverage range of more than one network, the personal communicator selects a network and/or switches to an appropriate different network or mode for coverage depending upon selected criteria. Preferably, the personal communicators 10a–e are configured to switch out of the mobile cellular network 14 to the private office network 15 or the home network 12 whenever communication with such other network can be reliably established. Where there is no network base station of any type network that is able to provide a desired Quality of Service (QoS), preferably the personal communicator seeks to establish a peer to peer connection with a target unit either directly or via a WTRU that can then relay communications to the target unit directly or through other network connections.

While communicating via a mobile network, the personal communicator preferably constantly monitors beacon channels transmitted by the home and/or private networks for which it is authorized to use to sense if it is within range of such networks. Once within range of a home or private network, the personal communicator establishes a link to that network and determines if it should switch to the network for coverage. If a switch is viable, then a switch will be carried out.

The received power of a home or private network beacon signal, as determined by the personal communicator, can form the basis for initiating a switch to such networks from a mobile network. Where a communication is in progress, the home or private network base station communicates with the mobile network's infrastructure via the network interface to initiate a hand off of the communication without interruption.

For example, the personal communicator 10b depicted in the automobile in FIG. 1C may be conducting a telephone call, via mobile network 14 ad indicated by the dashed line, with the personal communicator 10a in the home network serviced by home network base station 12. During the telephone call, if the personal communicator 10b travels within a predetermined range, preferably based on strength of beacon signal or other Quality of Service type of criteria, of either the home or office network, the respective home or office network base station 12, 15, will communicate an appropriate handover request that will terminate the wireless signaling between the personal communicator 10b and the mobile network base station 13.

In the case of the personal communicator 10b traveling within sufficient range of the home network, the communication between the two personal communicators 10a and 10b will continue via home base station 12. In the case of the personal communicator 10b traveling within sufficient range of the office network, the communication between the two personal communicators 10a and 10b will continue via the network interface between the home base station 12 and the office base station 15.

In the case of the personal communicator 10a traveling outside of the range of the home network, the mobile network 14 is alerted when a predetermined Quality of Service level is no longer available to the personal communicator 10a via home base station 12. The communication between the two personal communicators 10a and 10b then continues via the mobile network 14 unless they are in sufficient range of each other for peer to peer communications via ad hoc networking. Preferably the Quality of Service level that initiates a switch from mobile networking to local or ad hoc networking is somewhat higher than the Quality of Service level that relinquishes a communication via local networking or ad hoc networking to the mobile network.

Preferably, personal communicators 10a–e are configured such that when two personal communicators are within the geographic coverage area of the same base station, they will monitor the viability of switching to peer to peer communication. For simplicity, a preferred personal communicator configuration implements this feature for home and office type networks having a single base station such as the office network depicted in FIG. 1C that includes base station 15. Personal communicators 10c and 10d can determine they are each within range of the base station 15 based on characteristics associated with the beacon signal broadcast by the base station 15 such as received power of the beacon signal. Each such personal communicator 10c, 10d is preferably configured to transmit their own beacon signal periodically, while in range of the local base station 15, to indicate their availability to conduct peer to peer communications either for their own communications or as a relay for other wireless communications. Thus a communication between personal communicators 10c and 10d can be conducted directly as a peer to peer wireless communication, which can be given precedence over a communication between personal communicators 10c and 10d where both utilize wireless signaling with base station 15. Preferably a Quality of Service level that initiates a switch from local networking to ad hoc networking is somewhat higher than the Quality of Service level that relinquishes a communication via ad hoc networking to the local or mobile network.

Additionally, such ad hoc networking can enable, for example, the personal communicator 10e to utilize personal communicator 10d as a relay by establishing an ad hoc network among personal communicator 10d and 10e and base station 15. Thus, via such an ad hoc network, personal communicator 10e can communicate with, for example, personal communicator 10b using the network interface of base station 15. Note that personal communicator 10e is depicted as configured to give preference to the ad hoc network with personal communicator 10d, even though it may in fact be within range of one of the base stations 13 of mobile network 14. This is readily accomplished by providing precedence to ad hoc networking as well as home and private office networking over mobile cellular networking, such as based on receiving respective beacon signals with predetermined minimum characteristics indicative of a desired Quality of Service.

Ad hoc networking thus provides coverage in dead-spots in the coverage of the private office network. Since it is not cost effective to provide 100% in-building coverage, the ability to dynamically change the configuration and coverage of the ad hoc network is beneficial to optimally use the resources and system capacity to provide full coverage. Additionally, while the personal communicator is within the coverage of a mobile network, it may switch to the mobile network when peer to peer communication and/or ad hoc networking no longer provides acceptable Quality of Service. This can also facilitate private network optimization by the mobile network relaying coverage and location information to the private base station when the personal communicator is in a dead spot or approaching a hot spot.

The personal communicator's ability to create its own local area ad hoc network enables it to relieve mobile networks in hot spots by providing other personal communicators with local coverage. The personal communicator's ad hoc networking provides coverage of dead-spots by acting as a conduit between the personal communicator in a dead-spot and a base station.

Preferably, the personal communicators 10a–e are equipped with a Global Positioning System (GPS) so that they can communicate geographic location data of their respective positions. This can be relayed by any base station of any of the interfaced networks to, for example, the mobile network 14. The ability to relay location information enables the mobile network to gather statistics to optimize the network and to provide dynamic localized, short-term coverage optimization through use of, for example, smart antenna techniques, etc. For example, if the ad hoc network between personal communicator 10e and personal communicator 10d begins to fail, the location of personal communicator 10e can be conveyed to mobile network 14 via private network base station 15 so that a focused communication beam can be directed toward personal communicator 10e from a base station 13 of mobile network 14 to maintain seamless communications.

One minimal configuration of an overall system wherein the personal communicators are utilized preferably includes:
- a mobile network;
- a local network such as a wireless Office PBX with wired or wireless network interface;
- backend network software to provide coordination of resources to support wireless PBX and mobile network connection; and
- ad hoc networking support within the personal communicators, as a direct connection to the PBX base station or as a node or relay in the mobile network.

Preferably, the system is configured to track personal communicators entering or leaving the ad hoc network coverage area and to take appropriate actions to register or unregister personal communicators from the wireless PBX network.

In accordance with an embodiment of the invention, WTRUs are configured with a peer to peer mode of operation preferably by being equipped with wireless local area network (WLAN) modems to exchange information directly between similarly equipped WTRUs. The WTRUs can have an integrated or installed wireless WLAN device, such as 802.11(b) (WiFi) or Bluetooth compliant device, in order to communicate with each other. However, the proposed invention is applicable in any wireless system that implements a peer to peer mode of operation and also has network base station access by WTRUs.

Figure 2:
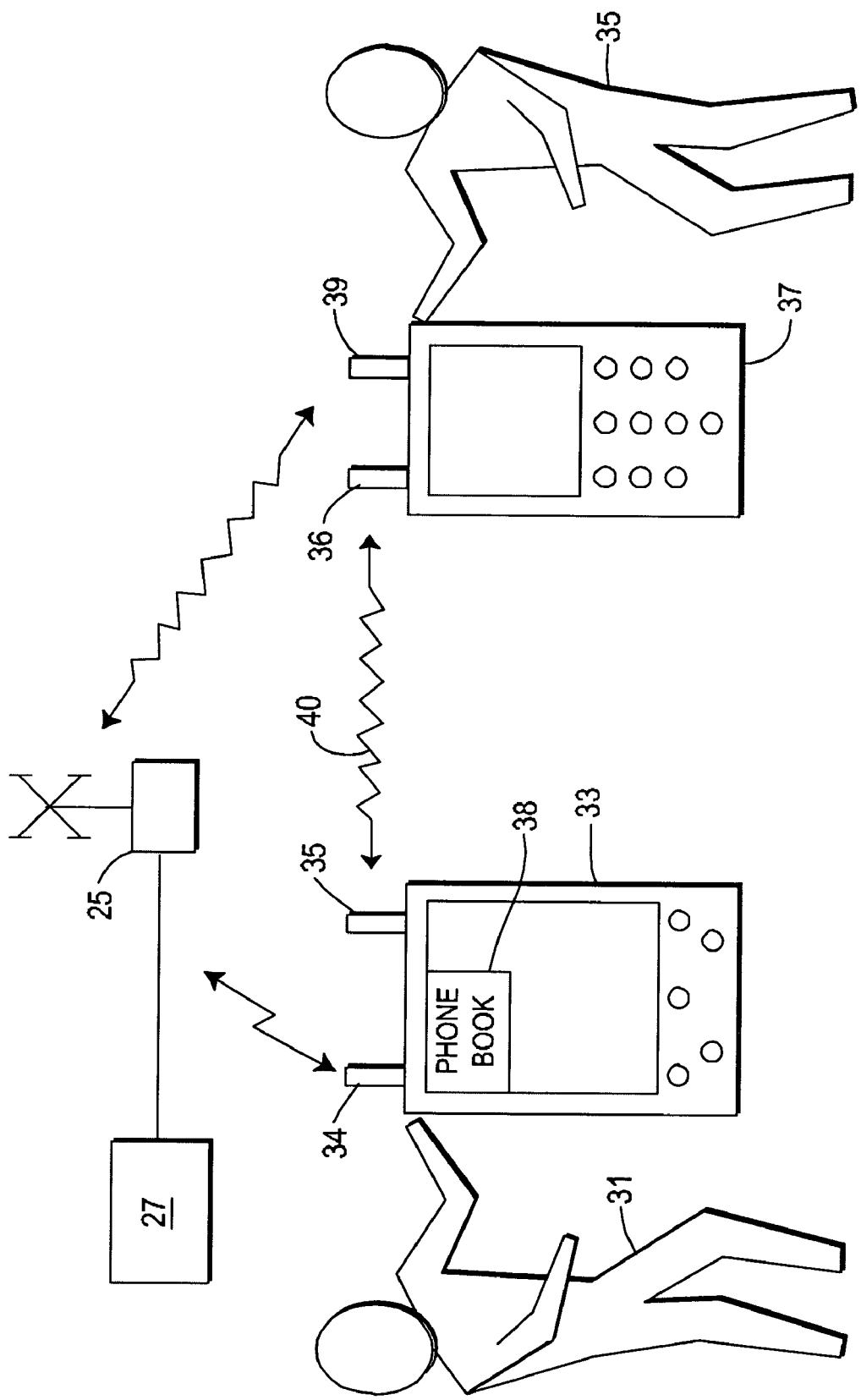
FIG. 2 is an illustration of the operation of two personal communicators and a network base station.

For example, referring to FIG. 2, a first user 31 is illustrated operating a first WTRU 33 in the form of a Pocket PC type phone device with an 802.11(b) WLAN card 35 installed. The WTRU 33 may be connected to a wireless telecommunications network 27 via a base station 25. The WTRU 33 transmits and receives radio frequency (RF) signals via antenna 34 to and from the base station 25. The Pocket PC type phone device 33, as is typical of such devices, contains a database with a phone book 38.

A second user 35 is illustrated operating a second WTRU 37 in the form of a cell phone with a built-in Palm type device including built-in 802.11(b) WLAN 36. The WTRU 37 can also connect with the wireless telecommunications network 27 via signals transmitted and received by antenna 39. The second user 35 may wish talk to the first user 31 or to access or copy the phone book 38 located in the first WTRU 33. Since both WTRUs 33, 37 have a WLAN modem and a phone network interface, the users 31, 35 are able to communicate either by means of peer to peer communication 40 using an 802.11(b) wireless network or by using the telecommunications network 27. Accordingly, there is a decision to be made as to which type of communication mode is to be used.

By shifting communications between WTRUs from an infrastructure mode to a peer-to-peer mode, the network can conserve telecommunication network resources and thereby realize increased service capacity. Other benefits can be realized in the potential for reduced interference and/or power conservation which is important to mobile WTRUs that operate using battery power.

The decision to bypass a communications network and use peer-to-peer techniques is preferably made by the WTRUs. A variety of factors can be used to make such decisions. As noted above, one preferred decision factor is the Quality of Service (QoS) between the WTRUs and a communication network's base station. In this regard, QoS as a decision factor is viewed in its broadest sense and can be formulated from a number of criteria including: quality of the radio signal, power consumption and/or the cost of the communication. Currently, communications via the mobile network are likely to be more than either via a home or office local network, but there can be varying cost factors between such local networks as well. A QoS threshold is preferably set so that a desired quality of radio signal is available for communicating at the lowest cost. When taking power consumption into account, which has a direct relationship to a mobile WTRU's battery life, the desired quality of radio signal which serves as a trigger to switch the communication may be different for different local networks and ad hoc networking because of relative cost factors.

Another criteria that can be included in setting QoS thresholds can be the type of communication to be conducted, for example voice communication between users 31 and 35 or data transfer of the phone book data on WTRU 33 to WTRU 37. In some instances, different QoS thresholds can be provided based on whether one or both types of communication are available.

Other variable criteria that can be used to formulate QoS decision factor thresholds to switch between the use of peer-to-peer techniques or infrastructure network communications include computed distances between respective stations. WTRUs equipped with a Global Positioning System (GPS) can provide the relevant data. Alternatively, distance information is readily obtained from known positioning techniques, such as time difference of arrival (TDOA) or adaptive antenna techniques where at least one fixed point is known, such as the location of a base station antenna. Preferably, a combination of criteria are employed which include maintaining the quality of the radio signal within an acceptable range of values.

The personal communicators are preferably configured with an ad hoc protocol so that the personal communicators interact with each other as well as mobile networks and private networks. Private networks are enhanced by use of the ad hoc networking. An appropriate ad hoc protocol also facilitates interaction of ad hoc networking with mobile network and seamless routing of calls and traffic between ad hoc and mobile networks, based on user location.

Figure 3:
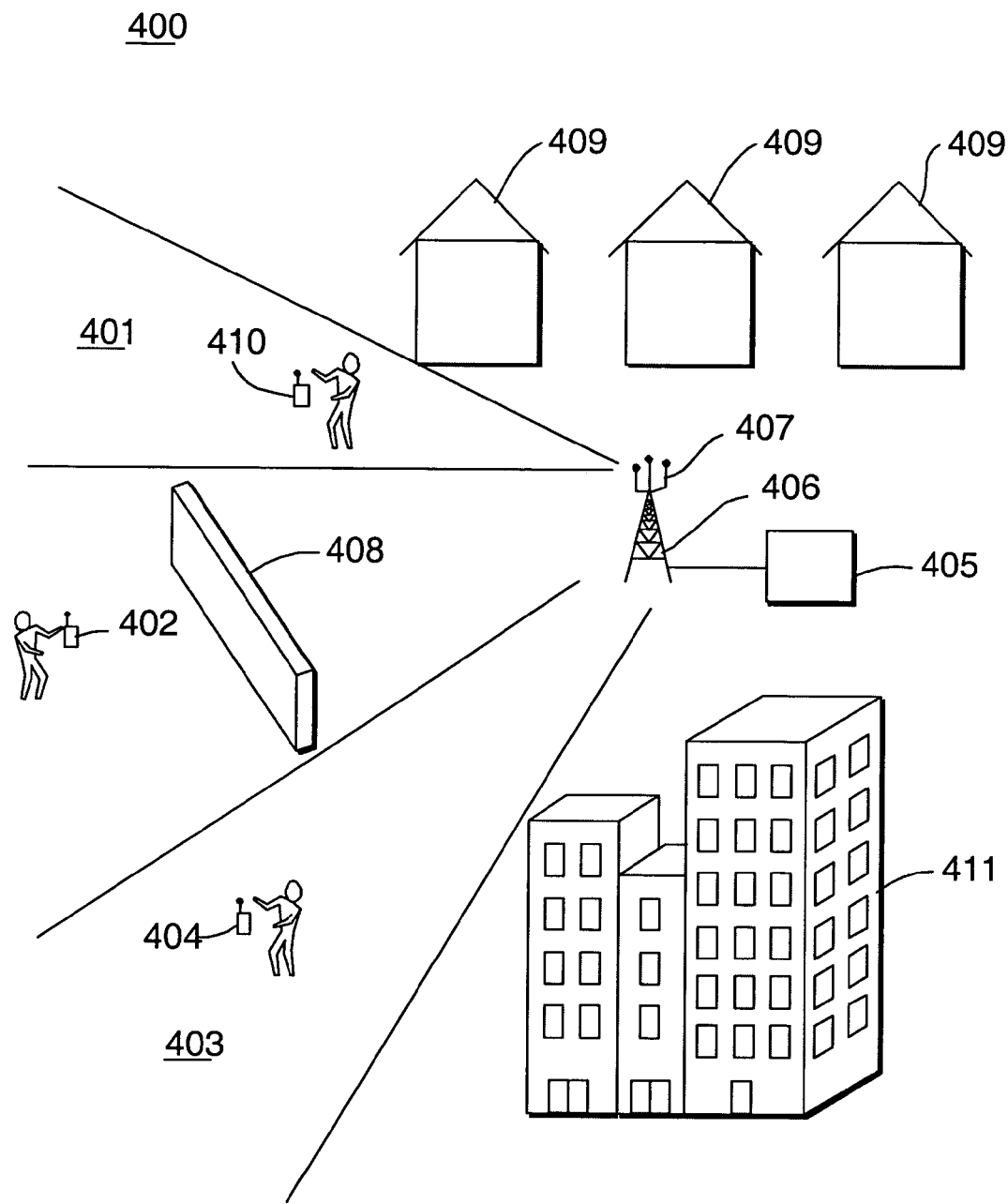
FIG. 3 is an illustration of the operation of several personal communicators in an environment having a network base station and various obstacles.

FIG. 3 illustrates an example of a network environment 400 where ad hoc networking of personal communicators is used to expand the service area of a base station 406 of a mobile network 405 where the personal communicators are also outside the range of home and private office networks. In view of obstacles such as an RF opaque wall 408, houses 409, and/or office buildings 411, the mobile network base station 406 may employ a beam forming antenna 407 to only service selected geographic areas 401, 403 such that those areas are hot spots for network infrastructure communications via the base station 406. Even if beam forming is not employed, areas 401 and 403 and other unobstructed areas may be the only areas where there is an acceptable QoS for certain services due to the intervening obstacles.

In such an environment 400, a personal communicator 402 that is not within range of home or private networks located in houses 409 and office buildings 412, but is in an obstructed area, such as obstructed by wall 408, may not be able to conduct wireless communications with mobile network 404 while another personal communicator 404 that is about the same distance from the network base station's antenna 407 can communicate. Also an obstacle, such as the wall 408 situated between personal communicator 410 and other personal communicators 402, 404 is an impediment to ad hoc network communications.

With conventional systems, the personal communicator 402 would not be able to communicate with the personal communicator 410 in either mode when located as illustrated in FIG. 3. However, in accordance with the invention, wireless communications can be conducted using the personal communicator 404 as a relay.

Since the personal communicator 402 is not in a geographic location for direct communication with mobile network 405 or home or private networks located in houses 409 and office buildings 412, for the personal communicator 402 to communicate with the personal communicator 410, the personal communicator 402 can first attempt to establish an ad hoc mode communication directly with the personal communicator 410 by sending a beacon signal that indicates a request to establish an ad hoc communication with an identification code associated with the personal communicator 410. This attempt would fail in the illustrated scenario of FIG. 3 due to the obstructing wall 408. Such a communication failure can be indicated after a predetermined connection time expires without a connection being established. The personal communicator 410 then transmits a beacon signal that includes a parameter requesting connection with a personal communicator that is currently in communication with a network base station along with a parameter indicating an identification of the personal communicator with which communication is sought. A personal communicator "joining" the ad hoc network conveys the identification parameter to the network base station with which it is in communication, which in turn attempts to complete the connection with the identified personal communicator.

In such an example as illustrated in FIG. 3, the personal communicator 402 initiates an ad hoc network with the personal communicator 404 which relays an identification of the personal communicator 410 to the mobile network 405 via the base station 406. The mobile network 405 then seeks to communicate with the identified personal communicator in a conventional manner through one of its base stations or an associated network as is well known in the art. In the example illustrated in FIG. 3, since the personal communicator 410 is within hot spot area 401 of base station 406, mobile network 405 finds the personal communicator 410 at that location and a connection is established between the personal communicators 402 and 410. The substance of the communication between the personal communicators 402 and 410 is conveyed via both ad hoc networking and mobile network connections with the personal communicator 404 as a relay.

Preferably, the personal communicators are configured such that if either the personal communicator 402 or 410 relocates so that there is no longer an impediment to direct peer to peer communications, the personal communicator 410 joins the ad hoc network started by the personal communicator 402 and the mobile network 405 is alerted to this handover and the mobile network connection is terminated. Similarly, if, for example, the personal communicator 410 relocates within an acceptable range of a home network within one of the houses 409, handover is made of the mobile network portion of the connection with the personal communicator 410 to the home network's base station. Likewise, if, for example, the personal communicator 404 relocates within an acceptable range of an office network within one of the office buildings 411, handover is made of the mobile network portion of the connection with the personal communicator 404 to the office network's base station, provided ad hoc networking can be maintained with the personal communicator 402.

The invention may be implemented in personal communicators in the form of WLAN modem equipped WTRUs employing 801.11 technology for peer to peer communications. However, this as not limiting and the invention may be implemented with WTRUs employing other types of peer to peer communication systems. The home and/or private office networks may also be configured as a WLAN using infrastructure mode access point base stations built according to the IEEE 802.11b standard. However, the present invention can be implemented for any wireless communications network system, such as a time division duplex (TDD) or frequency division duplex (FDD) wireless telephone system where the WTRUs which communicate with network base stations are also capable of peer to peer communications.

What is claimed is:

1. A wireless transmit/receive unit (WTRU) for communication in a wireless mobile network, at least one wireless local area network (WLAN), and for ad hoc peer to peer wireless communications with other WTRUs, comprising:

selectively operable transceiver components that are configured for wireless mobile network communications with mobile network base stations, WLAN communications with WLAN base stations, and wireless peer to peer communications with other WTRUs;

a transceiver controller configured to selectively control wireless communications with mobile network base stations based on communication signals received from WLAN base stations or other WTRUs such that:

a wireless mobile network communication is switched to a WLAN base station or other WTRU when wireless communication signals received from such WLAN base station or other WTRU indicates a first predetermined quality of service level available therefrom, and a wireless mobile network communication is sought to be established when a wireless communication with a WLAN base station or other WTRU indicates that at least a second predetermined quality of service level is no longer available therefrom and no communication signals are received from a WLAN base station or other WTRU that indicate availability of the first predetermined quality of service level; and said transceiver controller is further configured to selectively control wireless communications with WLAN base on communication signals received from other WTRUs such that:

a WLAN communication is switched to another WTRU when communication signals received from such other WTRU indicates a third predetermined quality of service level is available therefrom, and a WLAN communication is sought to be established when communication with another WTRU indicates that at least a fourth predetermined quality of service level is no longer available therefrom and no communication signals are received from other WTRUs that indicate availability of the third predetermined quality of service level.

2. The invention of claim 1 wherein the first predetermined quality of service level used by the transceiver controller is no greater than the third predetermined quality of service level used by the transceiver controller and the second predetermined quality of service level used by the transceiver controller is no greater than the fourth predetermined quality of service level used by the transceiver controller.

3. The invention of claim 1 wherein the transceiver components include a wireless local area network (WLAN) modem for the peer to peer communications with other WTRUs.

4. The invention of claim 1 wherein the WTRU is a mobile unit and the transceiver controller is configured to use a pre-determined quality of service level based on a quality of radio signal criteria in combination with a relative cost criteria, a power consumption criteria and/or an estimate of the geographic location of the mobile unit.

5. The invention of claim 4 further comprising a Global Positioning System (GPS) for generating the estimate of the geographic location of the mobile unit.

6. A method of communication using a wireless transmit/receive unit (WTRU) within multiple networks including a wireless mobile network, at least one wireless local area network (WLAN), and ad hoc peer to peer wireless networks with other WTRUs, comprising:

providing WTRUs having selectively operable transceiver components that are configured for wireless mobile network communications with mobile network base stations, WLAN communications with WLAN base stations, and ad hoc peer to peer wireless network communications with other WTRUs;

selectively controlling wireless communications of the WTRUs with mobile network base stations based on communication signals received from WLAN base stations or other WTRUs such that:

a wireless mobile network communication is switched to a WLAN base station or other WTRU when wireless communication signals received from such WLAN base station or other WTRU indicates a first predetermined quality of service level available therefrom, and a wireless mobile network communication is sought to be established when a wireless communication with a WLAN base station or other WTRU indicates that at least a second predetermined quality of service level is no longer available therefrom and no communication signals are received from a WLAN base station or other WTRU that indicate availability of the first predetermined quality of service level; and selectively controlling wireless communication with WLAN base stations based on communication signals received from other WTRUs such that:

a WLAN communication is switched to another WTRU when communication signals received from such other WTRU indicates a third predetermined quality of service level is available therefrom, and a WLAN communication is sought to be established when a communication with another WTRU indicates that at least a fourth predetermined quality of service level is no longer available therefrom and no communication signals are received from other WTRUs that indicate availability of the third predetermined quality of service level.

7. The method of claim 6 wherein the first predetermined quality of service level used is no greater than the third predetermined quality of service level used and the second predetermined quality of service level used is no greater than the fourth predetermined quality of service level used.

8. The method of claim 6 wherein WTRUs are provided with transceiver components that include a wireless local area network (WLAN) modem for peer to peer communications with other WTRUs.

9. The method of claim 6 wherein the pre-determined quality of service levels that are used are based on a quality of radio signal criteria in combination with a relative cost criteria, a power consumption criteria and/or an estimate of the geographic location of the mobile unit.

10. The method of claim 9 further comprising using a Global Positioning System (GPS) for generating the estimate of the geographic location of the WTRU.

* * * * *